United States Patent
Chen et al.

(10) Patent No.: US 9,860,850 B2
(45) Date of Patent: *Jan. 2, 2018

(54) METHOD AND APPARATUS FOR POWER CONTROL OF FIRST DATA TRANSMISSION IN RANDOM ACCESS PROCEDURE OF FDMA COMMUNICATION SYSTEM

(71) Applicant: QUALCOMM Incorporated, San Diego, CA (US)

(72) Inventors: Wanshi Chen, San Diego, CA (US); Juan Montojo, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,697

(22) Filed: Aug. 1, 2016

(65) Prior Publication Data

US 2016/0345271 A1 Nov. 24, 2016

Related U.S. Application Data

(63) Continuation of application No. 13/946,802, filed on Jul. 19, 2013, now Pat. No. 9,408,156, which is a (Continued)

(51) Int. Cl.
*H04W 52/14* (2009.01)
*H04W 52/16* (2009.01)
(Continued)

(52) U.S. Cl.
CPC ......... *H04W 52/146* (2013.01); *H04W 52/16* (2013.01); *H04W 52/367* (2013.01); *H04W 52/50* (2013.01)

(58) Field of Classification Search
CPC . H04W 52/146; H04W 52/367; H04W 52/16; H04W 52/50
See application file for complete search history.

(56) References Cited

U.S. PATENT DOCUMENTS 6,249,683 B1 6/2001 Lundby et al.
6,757,319 B1 6/2004 Parsa et al.
(Continued)

FOREIGN PATENT DOCUMENTS

JP 2002528997 A 9/2002
JP 2010034612 A 2/2010
(Continued)

OTHER PUBLICATIONS

"3rd Generation Partnership Project; Technical Specification Group Radio Access Network; Physical layer procedures (FDD) (Release 1999)", 3GPP Standard; 3GPP TS 25.214, 3rd Generation Partnership Project (3GPP), Mobile Competence Centre ; 650, Route Des Lucioles ; F-06921 Sophia-Antipolis Cedex ; France, vol. RAN WG1, No. V3.12.0, Section 6.1, Mar. 2003, 52 pages.
(Continued)

*Primary Examiner* — Andrew Lai
*Assistant Examiner* — Chuong M Nguyen
(74) *Attorney, Agent, or Firm* — Patterson & Sheridan, LLP

(57) ABSTRACT

Transmit power is controlled for a first uplink data transmission on Physical Uplink Shared Channel (PUSCH) during random access channel (RACH) procedure. Power control adjustment for the first PUSCH transmission is performed relative to the power spectral density used for successful PRACH transmission as adjusted for bandwidth difference, etc. The uplink Physical random access channel carries the RACH information that is transmitted by the user equipment (UE) during registrations or base station origi-
(Continued)

nated calls. A PRACH is composed of a number of preambles and a message portion. The preambles are a series of radio frequency power "steps" that increase in power according to the power step setting until the maximum number of preambles is reached or the base station acknowledges. Once the UE receives a positive indication, it transmits the message portion of the PRACH which consists of message data and control data with independent power gain control.

35 Claims, 10 Drawing Sheets

Related U.S. Application Data continuation of application No. 12/489,077, filed on Jun. 22, 2009, now Pat. No. 8,494,572.

(60) Provisional application No. 61/075,261, filed on Jun. 24, 2008.

(51) Int. Cl.
H04W 52/50 (2009.01)
H04W 52/36 (2009.01)

(56) References Cited

U.S. PATENT DOCUMENTS

| | | | |
|---|---|---|---|
| 6,859,445 B1 | 2/2005 | Moon et al. | |
| 7,020,483 B2 | 3/2006 | Oestreich | |
| 7,590,095 B2 | 9/2009 | Chen et al. | |
| 7,967,789 B2 | 6/2011 | Solar et al. | |
| 7,986,959 B2 | 7/2011 | Malladi et al. | |
| 8,068,868 B2 | 11/2011 | Chen et al. | |
| 8,072,918 B2 | 12/2011 | Muharemovic et al. | |
| 8,145,127 B2 | 3/2012 | Nory et al. | |
| 8,170,601 B2 | 5/2012 | Porat | |
| 8,274,931 B2 | 9/2012 | Pajukoski et al. | |
| 8,311,004 B2 | 11/2012 | Aiba et al. | |
| 8,401,561 B2 | 3/2013 | Englund et al. | |
| 8,494,572 B2 * | 7/2013 | Chen | H04W 52/16 370/318 |
| 9,408,156 B2 * | 8/2016 | Chen | H04W 52/16 |
| 2005/0254604 A1 | 11/2005 | MacMullan et al. | |
| 2006/0003704 A1 | 1/2006 | Jin | |
| 2007/0030829 A1 | 2/2007 | Vimpari et al. | |
| 2008/0009254 A1 | 1/2008 | Jin | |
| 2008/0095254 A1 * | 4/2008 | Muharemovic | H04L 5/0053 375/260 |
| 2008/0123585 A1 | 5/2008 | Granzow et al. | |
| 2008/0273610 A1 | 11/2008 | Malladi et al. | |
| 2008/0280638 A1 | 11/2008 | Malladi et al. | |
| 2009/0286566 A1 | 11/2009 | Lindholm et al. | |
| 2010/0093386 A1 | 4/2010 | Damnjanovic et al. | |
| 2010/0309877 A1 | 12/2010 | Damnjanovic et al. | |

FOREIGN PATENT DOCUMENTS

| | | | | |
|---|---|---|---|---|
| JP | 2010508785 A | 3/2010 | | |
| JP | 2014042276 A | 3/2014 | | |
| RU | 2249915 C2 | 4/2005 | | |
| RU | 2267222 C2 | 12/2005 | | |
| WO | WO-0025443 A1 | 5/2000 | | |
| WO | WO-0062443 | 10/2000 | | |
| WO | WO-0161884 | 8/2001 | | |
| WO | WO 2008042967 A2 * | 4/2008 | | H04L 1/0029 |
| WO | WO-2008042967 A2 | 4/2008 | | |
| WO | WO-2008055235 A2 | 5/2008 | | |
| WO | WO-2010008859 A1 | 1/2010 | | |

OTHER PUBLICATIONS

International Search Report and Written Opinion—PCT/US2009/048320, International Search Authority—European Patent Office—dated Dec. 2, 2009.

Nokia Siemens Networks et al., "UL grant for random access message 3", 3GPP TSG-RAN WG1 Meeting #53, R1-082078, May 9, 2008, 4 Pages.

Qualcomm Europe, "PRACH and Message3 power control", 3GPP TSG-RAN WG1 #53bis, R1-082551, Jun. 30-Jul. 4, 2008, Warsaw, Poland.

Taiwan Search Report—TW098121217—TIPO—dated Jun. 26, 2013.

Taiwan Search Report—TW103114289—TIPO—daed Jul. 21, 2015.

* cited by examiner

Contention-Based Random Access (RACH) Procedure

METHOD AND APPARATUS FOR POWER CONTROL OF FIRST DATA TRANSMISSION IN RANDOM ACCESS PROCEDURE OF FDMA COMMUNICATION SYSTEM

CLAIM OF PRIORITY UNDER 35 U.S.C. §120

This is a continuation application of U.S. application Ser. No. 13/946,802, filed Jul. 19, 2013, to be issued as U.S. Pat. No. 9,408,156 on Aug. 2, 2016, which is a continuation of U.S. application Ser. No. 12/489,077, filed Jun. 22, 2009, issued as U.S. Pat. No. 8,494,572 on Jul. 23, 2013, which claims priority to Provisional Application No. 61/075,261 entitled A METHOD AND APPARATUS FOR POWER CONTROL PRACH TO PUSCH, filed Jun. 24, 2008, each assigned to the assignee hereof, and each of which is hereby expressly incorporated by reference herein in its entirety.

BACKGROUND

Field

The present disclosure relates generally to communication and more specifically to techniques for controlling transmission power of a first message of a physical uplink shared channel (PUSCH) during a random access channel (RACH) procedure.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

The 3rd Generation Partnership Project (3GPP) Long Term Evolution (LTE) represents a major advance in cellular technology and is the next step forward in cellular services as a natural evolution of Global System for Mobile communications (GSM) and Universal Mobile Telecommunications System (UMTS). LTE provides for an uplink speed of up to 75 megabits per second (Mbps) and a downlink speed of up to 300 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum availability. LTE is also expected to improve spectral efficiency of 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies. These include Orthogonal Frequency Division Multiple Access (OFDMA) and Multiple Input Multiple Output (MIMO) data transmission on the downlink (DL) and Single Carrier—Frequency Division Multiple Access (SC-FDMA) on the uplink (UL). OFDMA and SC-FDMA allow data to be directed to or from multiple users on a set of subcarriers basis denoted by resource block (RB) for a specified number of symbol periods.

The Medium Access Control (MAC) layer is above the physical layer and performs uplink functions that include random access channel, scheduling, building headers, etc. Transport channels at the MAC layer are mapped onto PHY layer channels. The Uplink Shared Channel (UL-SCH) is the primary transport channel for data transmission on the UL and is mapped onto the Physical Uplink Shared Channel (PUSCH). Format variables are resource assignment size, modulation and coding, which determine data rate. When the UE is not connected or is not synchronized, no transmit subframes are scheduled. The Random Access Channel (RACH) provides a means for disconnected or not synchronized devices to access the UL. Transmitting on the PUSCH requires a resource allocation from the eNodeB, and time alignment to be current. Otherwise the RACH procedure is used.

The RACH procedure is used in four cases: initial access from a disconnected state (RRC_IDLE) or radio failure; handover requiring a random access procedure; downlink (DL) data arrival during RRC_CONNECTED after UL PHY has lost synchronization (possibly due to power savings operation); or UL data arrival when there is no dedicated scheduling request (SR) on PUCCH channels available. There are two forms for RACH transmission: Contention-based, which can apply to all four events above, and noncontention based, which applies to only handover and DL data arrival. The difference is whether or not there is a possibility for failure using an overlapping RACH preamble.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with transmitting a first transmission on a Physical Uplink Shared Channel (PUSCH) by appropriate application of transmit power control. The prior steps of Random Access Channel (RACH) procedure are performed by the Medium Access Control (MAC) layer and not by the Physical (PHY) layer, so the PHY layer does not know what transmit power level to set for this first message. To that end, Transmit Power Control (TPC) level used for successful transmission on Physical Random Access Channel (PRACH) can be communicated to an evolved Base Node (eNB) to generate a TPC command based at least in part upon power spectral density used for transmission of the first PUSCH message. Alternatively, a MAC layer of the UE managing transmission of RACH preamble can communicate the successful TPC level to a physical (PHY) layer of the UE that transmits the first PUSCH message.

In one aspect, a method is provided for transmitting a first physical uplink shared channel (PUSCH) message during a Random Access (RACH) procedure by employing a processor executing computer executable instructions stored on a computer readable storage medium to implement the following acts: Transmit power control is performed on transmitting a random access channel (RACH) preamble sufficient for successful receipt. Transmit power control is set for a first message transmitted on a physical uplink shared channel (PUSCH) based at least in part upon the successfully transmitted RACH preamble.

In another aspect, a computer program product is provided for transmitting a first physical uplink shared channel (PUSCH) message during a Random Access (RACH) procedure. At least one computer readable storage medium stores computer executable instructions that when executed by at least one processor implement components. A first set of instructions causes a computer to perform transmit power control on transmitting a random access channel (RACH) preamble sufficient for successful receipt. A second set of instructions causes the computer to set transmit power control for a first message transmitted on a physical uplink shared channel (PUSCH) based at least in part upon the successfully transmitted RACH preamble.

In an additional aspect, an apparatus is provided for transmitting a first physical uplink shared channel (PUSCH) message during a Random Access (RACH) procedure. At least one computer readable storage medium stores computer executable instructions that when executed by at least one processor implement components. Means are provided for performing transmit power control on transmitting a random access channel (RACH) preamble sufficient for successful receipt. Means are provided for setting transmit power control for a first message transmitted on physical uplink shared channel (PUSCH) based at least in part upon the successfully transmitted RACH preamble.

In a further aspect, an apparatus is provided for transmitting a first physical uplink shared channel (PUSCH) message during a Random Access (RACH) procedure. A transmitter transmits a physical random access channel (PRACH) and physical uplink shared channel (PUSCH). A medium access control (MAC) layer performs transmit power control on transmitting a random access channel (RACH) preamble sufficient for successful receipt. A physical (PHY) layer sets transmit power control for a first message transmitted on physical uplink shared channel (PUSCH) based at least in part upon the successfully transmitted RACH preamble.

In yet one aspect, a method is provided for receiving a first physical uplink shared channel (PUSCH) message during a Random Access (RACH) procedure. A random access channel (RACH) preamble is received. Successful receipt of the RACH preamble is acknowledged. A RACH message is received containing an indication of transmit power control used for the successful RACH preamble transmission. A random access response (RAR) is transmitted including a transmit power control (TPC) command for a first message transmitted on physical uplink shared channel (PUSCH) based at least in part upon a transmit power control for the successfully received RACH preamble.

In yet another aspect, a computer program product is provided for receiving a first physical uplink shared channel (PUSCH) message during a Random Access (RACH) procedure. At least one computer readable storage medium stores computer executable instructions that when executed by at least one processor implement components. A first set of instructions causes a computer to receive a random access channel (RACH) preamble. A second set of instructions causes the computer to acknowledge successful receipt of the RACH preamble. A third set of instructions causes the computer to receive RACH message containing an indication of transmit power control used for the successful RACH preamble transmission. A fourth set of instructions causes the computer to transmit a random access response (RAR) including a transmit power control (TPC) command for a first message transmitted on physical uplink shared channel (PUSCH) based at least in part upon a transmit power control for the successfully received RACH preamble.

In yet an additional aspect, an apparatus is provided for receiving a first physical uplink shared channel (PUSCH) message during a Random Access (RACH) procedure. At least one computer readable storage medium stores computer executable instructions that when executed by the at least one processor implement components. Means are provided for receiving a random access channel (RACH) preamble. Means are provided for acknowledging successful receipt of the RACH preamble. Means are provided for receiving a RACH message containing an indication of transmit power control used for successful RACH preamble transmission. Means are provided for transmitting a random access response (RAR) including a transmit power control (TPC) command for a first message transmitted on physical uplink shared channel (PUSCH) based at least in part upon a transmit power control for the successfully received RACH preamble.

In yet a further aspect, an apparatus is provided for receiving a first physical uplink shared channel (PUSCH) message during a Random Access (RACH) procedure. A receiver receives a random access channel (RACH) preamble on a physical random access channel (PRACH). A transmitter acknowledges successful receipt of the RACH preamble. The receiver receives RACH message containing an indication of transmit power control used for successful RACH preamble transmission. A computing platform transmits via the transmitter a random access response (RAR) including a transmit power control (TPC) command for a first message transmitted on physical uplink shared channel (PUSCH) based at least in part upon a transmit power control for the successfully received RACH preamble.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Transmit power is controlled for a first uplink data transmission on a Physical Uplink Shared Channel (PUSCH) during a random access channel (RACH) procedure. Power control adjustment for the first PUSCH (comprise uplink channel information) transmission is advantageously performed relative to the power spectral density used for the successful PRACH preamble transmission. The uplink Physical Random Access Channel (PRACH) carries the RACH information that is transmitted by the user equipment (UE) during registration, base station (BS) originated calls, etc. A PRACH is composed of two parts: a number of preambles and a message portion. The preambles are a series of transmissions that may increase in power according to the power step setting until the maximum number of preambles is reached or the base station acknowledges receiving the preamble or the UE maximum transmit power is reached. Once the UE receives an acknowledgement through RACH message 2 transmission or random access response (RAR) from the eNB, it transmits the message portion of the RACH (message 3). A Transmit Power Control (TPC) command is found in the random access response (RAR). According to some aspects, the power control command in the random access response message indicates a difference relative to PRACH Transmit (Tx) power spectral density. This is a special case of PUSCH transmit power control.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
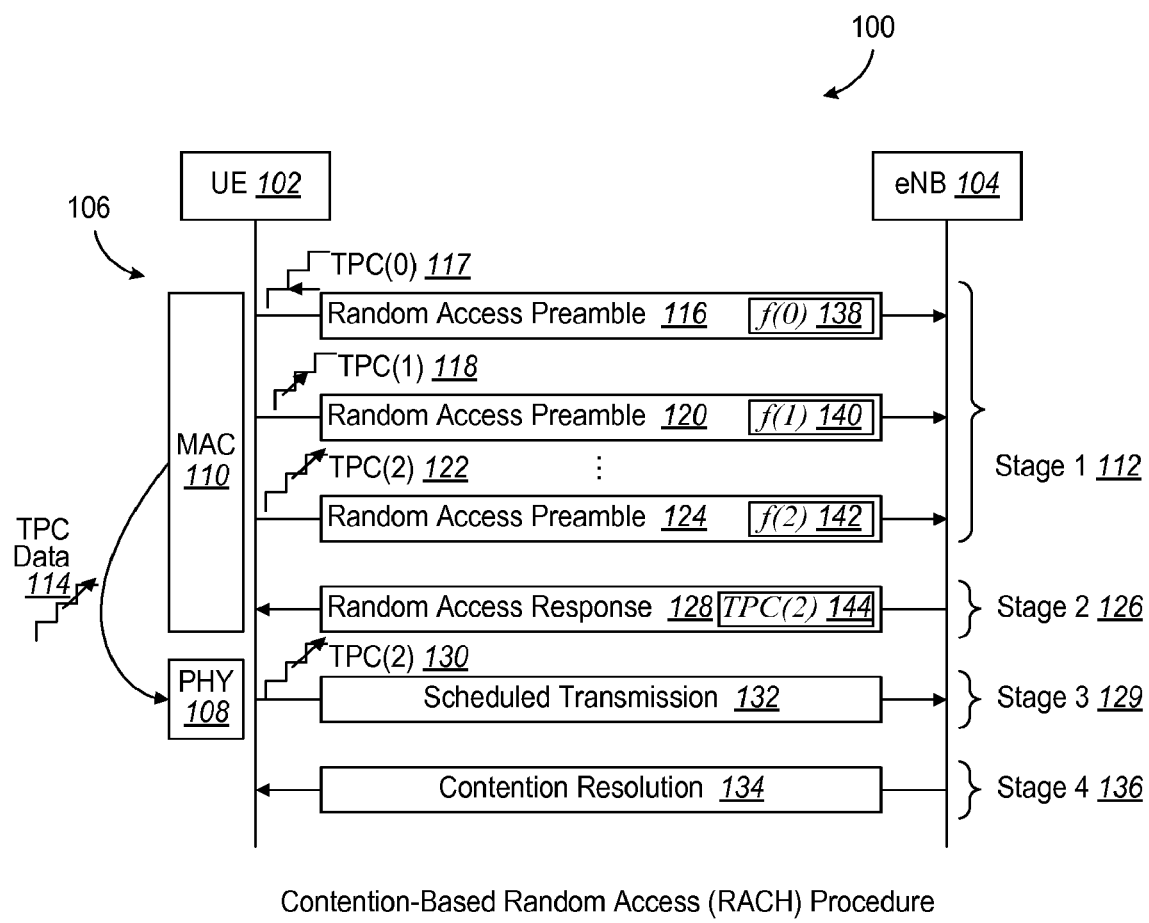
FIG. 1 depicts a message exchange diagram of a wireless communication system in which user equipment (UE) bases transmit power control in part of a first message on a physical uplink shared channel (PUSCH) on a successfully received random access channel (RACH) preamble during a RACH procedure.

With reference to FIG. 1, a communication system 100 of user equipment (UE) 102 communicating wirelessly with an evolved Base Node (eNB) 104 supports a contention-based Random Access (RACH) procedure 106 that benefits from transmit power control (TPC) of a first message sent on a Physical Uplink Shared Channel (PUSCH) by a Physical (PHY) Layer 108. To that end, a medium access control (MAC) 110 performs transmit power control (TPC) during stage 1 112 on Random Access Channel (RACH) and shares TPC data as depicted at 114 with the PHY 108.

In an exemplary depiction, the MAC 110 performs TPC by transmitting a random access preamble (block 116) on a Physical Random Access Channel (PRACH) from the UE 102 to the eNB 104 at a nominal transmit power level as depicted at 117. This nominal transmit power level may be based on the DL path loss and the UE 102 can have gained information via the various system information blocks (SIB s) from the eNB 104 indicating Physical Random Access Channel (PRACH) timing and resources and contention management parameters (e.g., number of retries, etc.). MAC 110 determines that the lack of a received random access response (RAR) indicates that the random access preamble was not received at a nominal transmit power and sets a stepped up transmit power as depicted at 118. MAC 110 retransmits a random access preamble (block 120). MAC 110 determines that a maximum number of preamble retransmissions has not occurred and that the lack of a received random access response (RAR) indicates that the random access preamble was not received at the stepped up transmit power. In particular, MAC 110 continues retransmitting a RACH preamble at a stepped up transmit power value in response to not receiving a random access response until the maximum number is reached. In the illustrative depiction, MAC 110 sets a twice stepped up transmit power as depicted at 122 and retransmits a random access preamble (block 124).

Stage 2 126 occurs with a successfully received RAR (block 128) from the eNB 104. This RAR 128 can provide information such as an assigned temporary Radio Network Temporary Identifier (RNTI) for UE 102 and schedules uplink grant so that UE 102 can forward more capability information. By virtue of monitoring the number of retransmissions with corresponding transmit power increases, MAC 110 gains some TPC data 114 for sharing for successful first PUSCH transmission. Thus in stage 3 129, the PHY 108 successfully sets TPC as depicted at 130 and transmits the first PUSCH scheduled transmission (block 132) to the eNB 104. Thereafter, the eNB 104 transmits contention resolution message (block 134) as stage 4 136, concluding the RACH procedure 106.

It should be appreciated that there are many other factors in determining the transmit power that can be addressed or approximated. Advantageously, TPC can determine power spectral density of PRACH, adjusted based on PUSCH bandwidth relative to PRACH bandwidth (e.g., fixed at 6 dB), the payload size of message 3 (which impacts the receiver sensitivity of PUSCH in relation to the sensitivity of PRACH reception), potential noise/interference variations between PRACH and PUSCH, and other possible reasons.

As an alternative to relaying transmit power control data between MAC layer 110 and PHY layer 108 in UE 102 (e.g., locally retained value), the UE 102 can include TPC data in the random access preamble 116, 120, 124, depicted as nominal transmit power f(0) 138, first stepped up transmit power f(1) 140, and second stepped up transmit power f(2)

142. The eNB 104 successfully receives the last one and incorporates a transmit power control (TPC) command 144 as part of the RAR 128.

Figure 2:
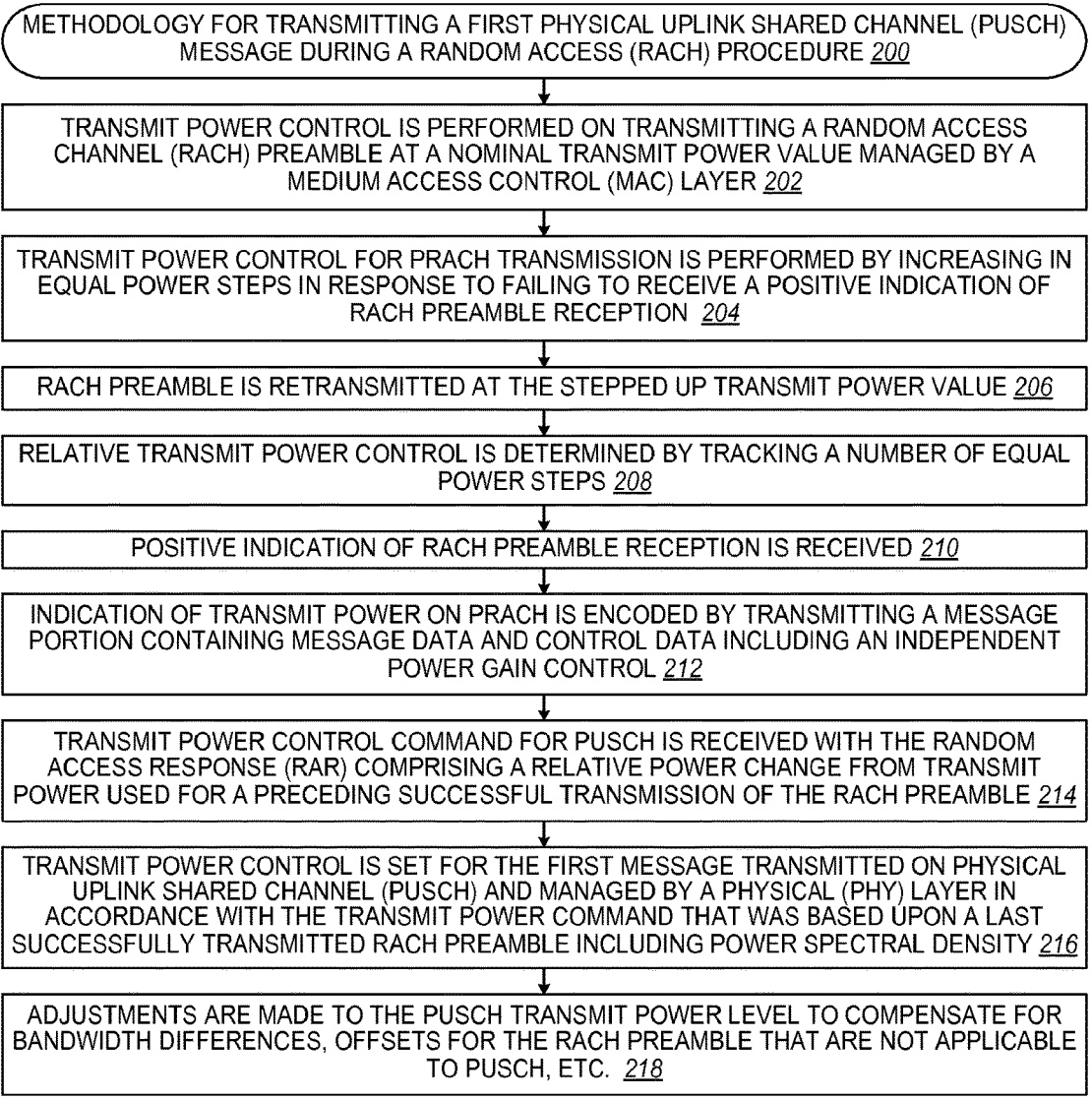
FIG. 2 depicts a flow diagram for a methodology or sequence of operations for transmit power control of a first PUSCH message during RACH procedure.

In FIG. 2, a methodology or sequence of operations 200 is provided for transmitting a first physical uplink shared channel (PUSCH) message during a Random Access (RACH) procedure. Transmit power control is performed on transmitting a random access channel (RACH) preamble at a nominal transmit power value managed by a medium access control (MAC) layer (block 202). Transmit power control for PRACH transmission is performed by increasing in equal power steps in response to failing to receive a positive indication of RACH preamble reception, which can further entail determining the relative transmit power control by determining a maximum transmit power that limits the number of equal power steps (block 204). In another aspect, these power steps can be equal or unequal as predefined in a manner known or communicated between UE and eNB. A RACH preamble is retransmitted at the stepped up transmit power value (block 206). A relative transmit power control is determined by tracking a number of equal power steps (block 208). A positive indication of RACH preamble reception is received (block 210). An indication of transmit power on PRACH is encoded by transmitting a message portion containing message data and control data including an independent power gain control (block 212). Indicated transmit power control can be achieved, for instance, by having the MAC layer encode this indication. A transmit power control command for PUSCH is received with the random access response (RAR) comprising a relative power density spectrum change from transmit power used for a preceding successful transmission of the RACH preamble (block 214). Transmit power control is set for the first message transmitted on physical uplink shared channel (PUSCH) and managed by a physical (PHY) layer in accordance with the transmit power command that was based in part upon a last successfully transmitted RACH preamble including power spectral density (block 216). Adjustments are made to the PUSCH transmit power level for compensating for bandwidth differences, an offset or offsets for the RACH preamble that are not applicable to PUSCH, etc. (block 218). For example, the methodology can further provide for adjusting for a partial path loss on PUSCH whereas total power control for PRACH is for full path loss, for adjusting for power offset representing different message receive sensitivity/quality requirement of PRACH and PUSCH wherein the relative receive sensitivity is a function of a coverage requirement, target quality, physical layer coding, modulation, transmission bandwidth, and for adjusting for a power offset for different noise/interference levels seen by PRACH transmission and PUSCH transmission.

Thus, in an exemplary aspect, PRACH power control is leveraged for transmit power control by the physical layer of the first PUSCH message relative to the power spectral density of the successful PRACH transmission and the TPC in the random access response and perhaps other factors. In one aspect, a random access response (RAR) carries a Transmission Control Protocol (TPC) command of (e.g., 3 or 4 bits). The TPC may provide a delta with respect to only the nominal PUSCH power spectral density, given the received PRACH power spectral density. However, due to PRACH power ramping (performed by MAC) the eNB cannot know the actual transmit power of PRACH, and therefore cannot provide a delta with respect to nominal PUSCH power spectral density. With PRACH power ramp up steps of up to 6 dB, such power control uncertainty seems unacceptable. Instead, the TPC provides a delta with respect to the power spectral density of the successful PRACH transmission being responded to in the random access response.

For instance, a starting point for cumulative power control transmit power f(0) is set as follows:

$$f(0) = P_{PRACH} - 10 \log_{10}(6) - P_{O\_PUSCH}(j) + \delta_{RACH\_PUSCH}$$

where subtracting $10 \log_{10}(6)$ normalizes the transmit power to 1 RB. Note that this value is later modified by $10 \log_{10}(M_{PUSCH}(1))$; It should be appreciated that while PRACH bandwidth is fixed at 6 RBs, PUSCH bandwidth, represented by M_PUSCH(1) may vary. The transmit power control of the first PUSCH transmission is to rely on the PSD of PRACH, and is then adjusted accounting for bandwidth difference.

$P_{PRACH}$ is defined as provided below; and $\delta_{RACH\_PUSCH}$ is the TPC command included in the random access response. The first PUSCH transmission will therefore use power relative to the successful PRACH transmission:

$$P_{PUSCH}(1) = \min\{P_{MAX}, 10 \log_{10}(M_{PUSCH}(1)) + \alpha \cdot PL + \Delta_{TF}(1) + P_{PRACH} - 10 \log_{10}(6) + \delta_{RACH\_PUSCH}\}$$

Physical Random Access Channel.

UE behavior. The setting of the UE Transmit power $P_{PRACH}$ for the physical random access channel (PRACH) transmission in subframe i is defined by:

$$P_{PRACH} = \min\{P_{MAX}, \text{PREAMBLE\_RECEIVED\_TARGET\_POWER} - PL\} \text{ [dBm]}$$

where, $P_{MAX}$ is the maximum allowed power that depends on the UE power class;

PREAMBLE_RECEIVED_TARGET_POWER is indicated by the upper layer as part of the request;

PL is the downlink pathloss estimate calculated in the UE.

Uplink power control. Uplink power control controls the transmit power of the different uplink physical channels. A cell wide overload indicator (OI) is exchanged over X2 for inter-cell power control. An indication X also exchanged over X2 indicates PRBs that an eNodeB scheduler allocates to cell edge UEs and that will be most sensitive to inter-cell interference.

Physical Uplink Shared Channel.

With regard to UE behavior according to some aspects, the setting of the UE Transmit power $P_{PUSCH}$ for the physical uplink shared channel (PUSCH) transmission in subframe i (i≥1) is defined by $$P_{PUSCH}(i) = \min\{P_{MAX}, 10 \log_{10}(M_{PUSCH}(i)) + P_{O\_PUSCH}(j) + \alpha \cdot PL + \Delta_{TF}(i) + f(i)\}$$

[dBm], where, $P_{MAX}$ is the maximum allowed power that depends on the UE power class;

$M_{PUSCH}(i)$ is the size of the PUSCH resource assignment expressed in number of resource blocks valid for subframe i;

$P_{O\_PUSCH}(j)$ is a parameter composed of the sum of a 8-bit cell specific nominal component $P_{O\_NOMINAL\_PUSCH}(j)$ signaled from higher layers for j=0 and 1 in the range of [426,24] dBm with 1 dB resolution and a 4-bit UE specific component $P_{O\_UE\_PUSCH}(j)$ configured by RRC for j=0 and 1 in the range of [−8, 7] dB with 1 dB resolution. For PUSCH (re)transmissions corresponding to a configured scheduling grant then j=0 and for PUSCH (re)transmissions corresponding to a received PDCCH with DCI format 0 associated with a new packet transmission then j=1.

α∈{0, 0.4, 0.5, 0.6, 0.7, 0.8, 0.9, 1} is a 3-bit cell specific parameter provided by higher layers;

PL is the downlink pathloss estimate calculated in the UE;

$\Delta_{TF}(i) = 10 \log_{10}(2^{MPR(i) \cdot K_S} - 1)$ for $K_S=125$ and 0 for $K_S=0$ where $K_S$ is a cell specific parameter given by RRC;

$MPR(i)=TBS(i)/N_{RE}(i)$ where $TBS(i)$ is the Transport Block Size for subframe i and $N_{RE}(i)$ is the number of resource elements determined as $N_{RE}(i) = 2M_{PUSCH}(i) \cdot N_{sc}^{RB} \cdot N_{symb}^{UL}$ for subframe i.

$\delta_{PUSCH}$ is a UE specific correction value, also referred to as a TPC command and is included in PDCCH with DCI format 0 or jointly coded with other TPC commands in PDCCH with DCI format 3/3A. The current PUSCH power control adjustment state is given by f(i) which is defined by:

$f(i)=f(i-1)+\delta_{PUSCH}(i-K_{PUSCH})$, i>1, if f(*) represents accumulation, where the value of $K_{PUSCH}$ is given by: For FDD, $K_{PUSCH}=4$; For TDD UL/DL configurations 1-6, $K_{PUSCH}$ is given in Table 1 below; and for TDD UL/DL configuration 0, $K_{PUSCH}=7$. The latter applies when the PUSCH transmission in subframe 2 or 7 is scheduled with a PDCCH of DCI format 0 in which the second bit of the UL index is set.

For all other PUSCH transmissions, $K_{PUSCH}$ is given in TABLE 1. The UE attempts to decode a PDCCH of DCI format 0 and a PDCCH of DCI format 3/3A in every subframe except when in DRX.

$\delta_{PUSCH}=0$ dB for a subframe where no TPC command is decoded or where DRX occurs or i is not an uplink subframe in TDD.

The $\delta_{PUSCH}$ dB accumulated values signaled on PDCCH with DCI format 0 are [−1, 0, 1, 3].

The $\delta_{PUSCH}$ dB accumulated values signaled on PDCCH with DCI format 3/3A are one of [−1, 1] or [−1, 0, 1, 3] as semi-statically configured by higher layers.

If UE has reached maximum power, positive TPC commands shall not be accumulated.

If UE has reached minimum power, negative TPC commands shall not be accumulated.

UE shall reset accumulation (a) at cell-change; (b) when entering/leaving RRC active state; (c) when an absolute TPC command is received; (d) when $P_{O\_UE\_PUSCH}(j)$ is received; and (e) when the UE (re)synchronizes.

$f(i)=\delta_{PUSCH}(i-K_{PUSCH})$, i>1, if f(*) represents current absolute value where $\delta_{PUSCH}(i-K_{PUSCH})$ was signaled on PDCCH with DCI format 0 on subframe $i-K_{PUSCH}$.

The value of $K_{PUSCH}$: for FDD, $K_{PUSCH}=4$; for TDD UL/DL configurations 1-6, $K_{PUSCH}$ is given in TABLE 1; and for TDD UL/DL configuration 0 is given by whether the PUSCH transmission in subframe 2 or 7 is scheduled with a PDCCH of DCI format 0 in which the second bit of the UL index is set, $K_{PUSCH}=7$ and for all other PUSCH transmissions, $K_{PUSCH}$ is given in TABLE 1.

The $\delta_{PUSCH}$ dB absolute values signaled on PDCCH with DCI format 0 are [−4, −1, 1, 4]. f(i)=f(i−1) for a subframe where no PDCCH with DCI format 0 is decoded or where DRX occurs or i is not an uplink subframe in TDD. f(*) type (accumulation or current absolute) is a UE specific parameter that is given by RRC. For both types of f(*) (accumulation or current absolute) the first value is set as follows:

$f(1)=P_{PRACH}-10 \log_{10}(6)-P_{O\_PUSCH}(j)+\delta_{RACH\_PUSCH}$ where $\delta_{RACH\_PUSCH}$ the TPC command indicated in the random access response.

TABLE 1

$K_{PUSCH}$ for TDD configuration 0-6.

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

POWER HEADROOM. The UE power headroom PH valid for subframe i is defined by $PH(i)=P_{MAX}-\{10 \log_{10}(M_{PUSCH}(i))+P_{O\_PUSCH}(j)+\alpha \cdot PL+\Delta_{TF}(TF(i))+f(i)\}$ [dB]

where, $P_{MAX}$, $M_{PUSCH}(i)$, $P_{O\_PUSCH}(j)$, α, PL, $\Delta_{TF}(TF(i))$ and f(i) are known to those skilled in the art. The power headroom can be rounded to the closest value in the range [40; −23] dB with steps of 1 dB and is delivered by the physical layer to higher layers.

Figure 3:
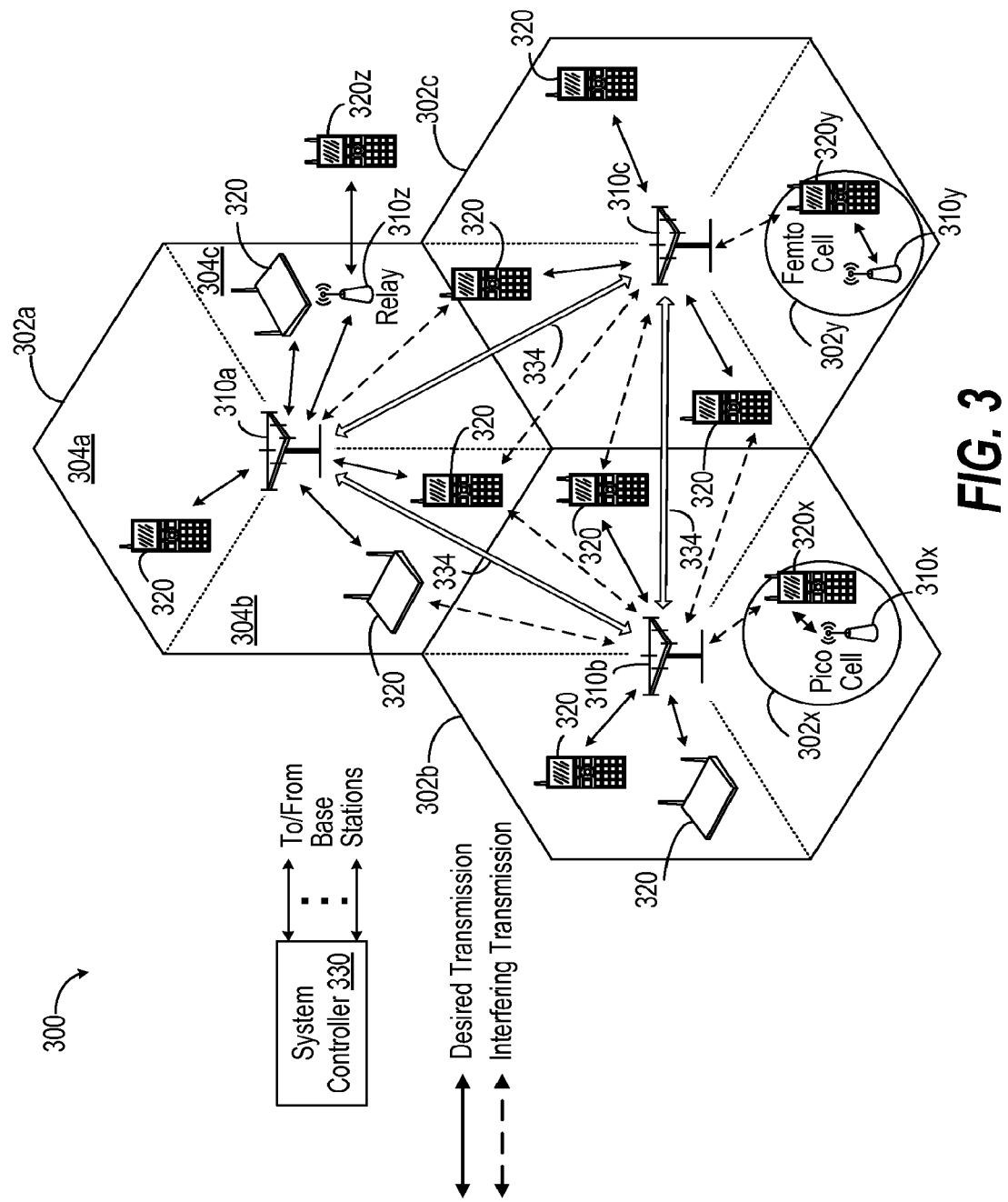
FIG. 3 depicts a block diagram of base stations serving and interfering with a population of terminals.

In the example shown in FIG. 3, base stations 310a, 310b and 310c may be macro base stations for macro cells 302a, 302b and 302c, respectively. Base station 310x may be a pico base station for a pico cell 302x communicating with terminal 320x. Base station 310y may be a femto base station for a femto cell 302y communicating with terminal 320y. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310z that communicates with terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network or system controller 330 may couple to a set of base stations and provide coordination and control for these base stations. Network controller 330 may be a single network entity or a collection of network entities. Network controller 330 may communicate with base stations 310a-310c via a backhaul. Backhaul network communication 334 can facilitate point-to-point communication between base stations 310a-310c employing such a distributed architecture. Base stations 310a-310c may also communicate with one another, e.g., directly or indirectly via wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and a different impact on interference in the wireless network 300. For example, macro base stations may have a high transmit power level (e.g., 20 Watts) whereas pico and femto base stations may have a low transmit power level (e.g., 3 Watts). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as the Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 310a, where each group of antennas is responsible for communication with terminals 320 in a portion of the cell 302a, 302b, or 302c. For example, a base station 310a serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
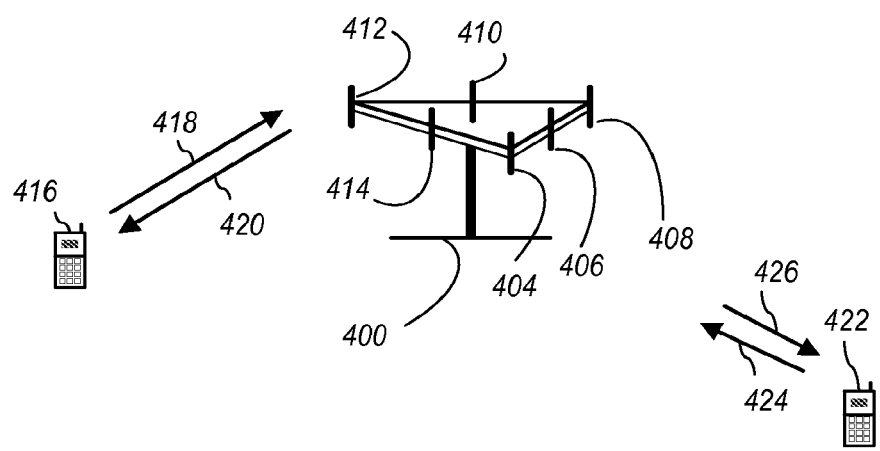
FIG. 4 depicts a block diagram of a multiple access wireless communication system.

Referring to FIG. 4, a multiple access wireless communication system according to one aspect is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequencies for communication. For example, forward link 420 may use a different frequency then that used by reverse link 418.

Each group of antennas and/or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 422. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

Figure 5:
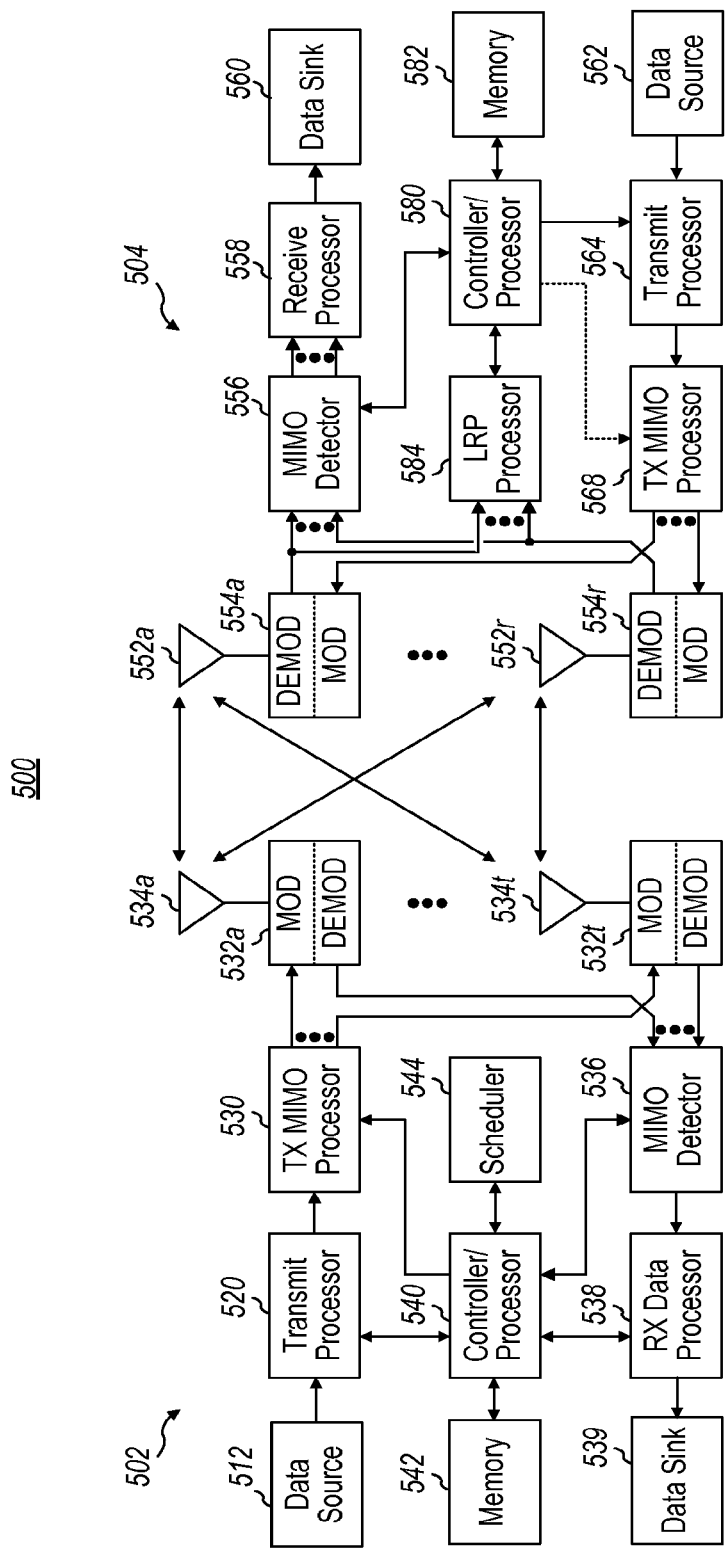
FIG. 5 depicts a block diagram of a communication system between a base station and a terminal.

FIG. 5 shows a block diagram of a design of a communication system 500 between a base station 502 and a terminal 504, which may be one of the base stations and one of the terminals in FIG. 1. Base station 502 may be equipped with TX antennas 534a through 534t, and terminal 504 may be equipped with RX antennas 552a through 552r, where in general T≥1 and R≥1.

At base station 502, a transmit processor 520 may receive traffic data from a data source 512 and messages from a controller/processor 540. Transmit processor 520 may process (e.g., encoding, interleaving, and modulating) the traffic data and messages and provide data symbols and control symbols, respectively. Transmit processor 520 may also generate pilot symbols and data symbols for a low reuse preamble and pilot symbols for other pilots and/or reference signals. A transmit (TX) multiple-input multiple-output (MIMO) processor 530 may perform spatial processing (e.g., precoding) on the data symbols, the control symbols, and/or the pilot symbols, if applicable, and may provide T output symbol streams to T modulators (MODs) 532a through 532t. Each modulator 532 may process a respective output symbol stream (e.g., for OFDM, SC-FDM, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At terminal 504, antennas 552a through 552r may receive the downlink signals from base station 502 and may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, SC-FDM, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate, deinterleave, and decode) the detected symbols, provide decoded traffic data for terminal 504 to a data sink 560, and provide decoded messages to a controller/processor 580. A low reuse preamble (LRP) processor 584 may detect low reuse preambles from base stations and provide information for detected base stations or cells to controller/processor 580.

On the uplink, at terminal 504, a transmit processor 564 may receive and process traffic data from a data source 562 and messages from controller/processor 580. The symbols from transmit processor 564 may be precoded by a TX MIMO processor 568 if applicable, further processed by modulators 554a through 554r, and transmitted to base station 502. At base station 502, the uplink signals from terminal 504 may be received by antennas 534, processed by demodulators 532, detected by a MIMO detector 536 if applicable, and further processed by a receive data processor 538 to obtain the decoded packets and messages transmitted by terminal 504 for providing to a data sink 539.

Controllers/processors 540 and 580 may direct the operation at base station 502 and terminal 504, respectively. Processor 540 and/or other processors and modules at base station 502 may perform or direct processes for the techniques described herein. Processor 580 and/or other processors and modules at terminal 504 may perform or direct processes for the techniques described herein. Memories 542 and 582 may store data and program codes for base station 502 and terminal 504, respectively. A scheduler 544 may schedule terminals for data transmission on the downlink and/or uplink and may provide resource grants for the scheduled terminals.

Figure 6:
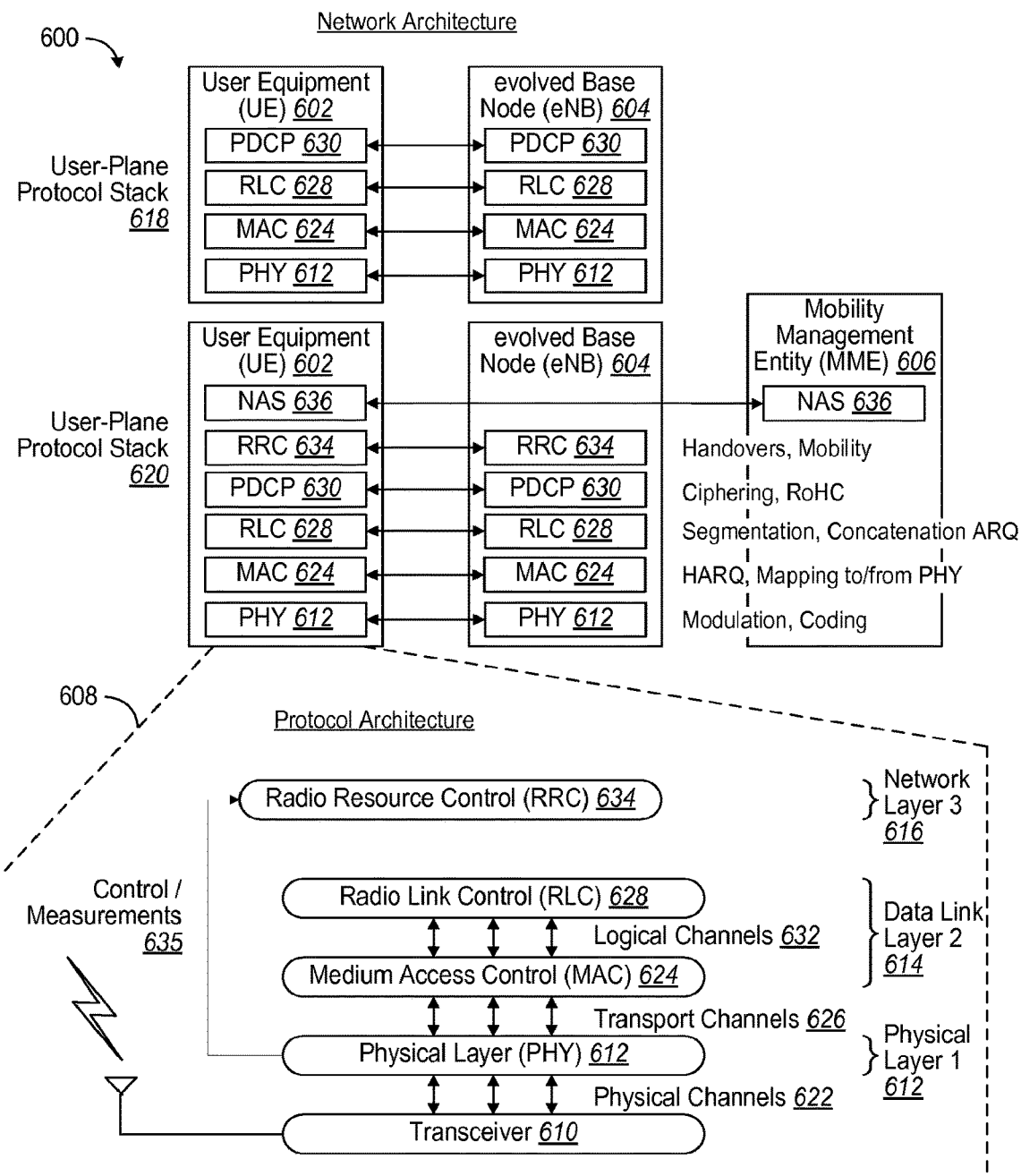
FIG. 6 depicts a block diagram of a network architecture and protocol stack.

In FIG. 6, a wireless network 600 is depicted with user equipment (UE) 602, an evolved Base Node (eNB) 604 and a mobility management entity (MME) 606. A radio interface protocol architecture 608 can be provided according to the 3GPP radio access network standards. The radio interface protocol 608 that utilizes a transceiver 610 has horizontal layers comprising a physical (PHY) layer 612, a data link layer 614, and a network layer 616, and has planes comprising a user plane (U-plane) 618 for transmitting user data and a control plane (C-plane) 620 for transmitting control information. The user plane 618 is a region that handles traffic information with the user, such as voice or Internet protocol (IP) packets. The control plane 620 is a region that handles control information for an interface with a network, maintenance and management of a call, and the like.

The protocol layer 1 (L1) 612, namely, the physical layer (PHY), communicates downwardly via physical channels 622 with transceiver 610. The physical layer 612 is connected to an upper layer called a medium access control (MAC) layer 624 of layer 2 (L2) 614, via a transport channel 626 to provide an information transfer service to an upper layer by using various radio transmission techniques. The second layer (L2) 614 further includes a radio link control (RLC) layer 628, a broadcast/multicast control (BMC) layer (not shown), and a packet data convergence protocol (PDCP) layer 630. The MAC layer 624 handles mapping between logical channels 632 and transport channels 626 and provides allocation of the MAC parameters for allocation and re-allocation of radio resources. The MAC layer 624 is connected to the upper layer called the radio link control (RLC) layer 628, via the logical channels 632. Various logical channels are provided according to the type of information transmitted. The MAC layer 624 is connected to the physical layer 612 by transport channels 626 and can be divided into sub-layers, and in particular supports in the uplink the Random Access Channel (RACH).

The RLC layer 628, depending on the RLC mode of operation, supports reliable data transmissions and performs segmentation and concatenation on a plurality of RLC service data units (SDUs) delivered from an upper layer. When the RLC layer 628 receives the RLC SDUs from the upper layer, the RLC layer adjusts the size of each RLC SDU in an appropriate manner based upon processing capacity, and then creates data units by adding header information thereto. These data units, called protocol data units (PDUs), are transferred to the MAC layer 624 via a logical channel 632. The RLC layer 628 includes a RLC buffer (not shown) for storing the RLC SDUs and/or the RLC PDUs.

The PDCP layer 630 is located above the RLC layer 628. The PDCP layer 630 is used to transmit network protocol data, such as IPv4 or IPv6, efficiently on a radio interface with a relatively small bandwidth. For this purpose, the PDCP layer 630 reduces unnecessary control information used in a wired network, namely, a function called header compression is performed. In some protocols, security features such as ciphering and robust header compression (RoHC) are performed by the PDCP layer 630.

A radio resource control (RRC) layer 634 located at the lowest portion of the third layer (L3) 616 is only defined in the control plane 620. The RRC layer 634 controls the transport channels 626 and the physical channels 622 in relation to setup, reconfiguration, and the release or cancellation of the radio bearers (RBs). The RB signifies a service provided by the second layer (L2) 614 for data transmission between the terminal and Evolved Universal Mobile Telecommunications System Terrestrial Radio Access Network (E-UTRAN), represented by MME 606. In general, the set up of the RB refers to the process of stipulating the characteristics of a protocol layer and a channel required for providing a specific data service, and setting the respective detailed parameters and operation methods. Additionally, the RRC layer 634 handles user mobility within the RAN, and additional services, e.g., location services. The RRC layer 634 receives control/measurements 635 from the physical layer. Also in the control plane 620, the UE 602 and MME 606 include a non-access stratum (NAS) 636.

Figure 7:
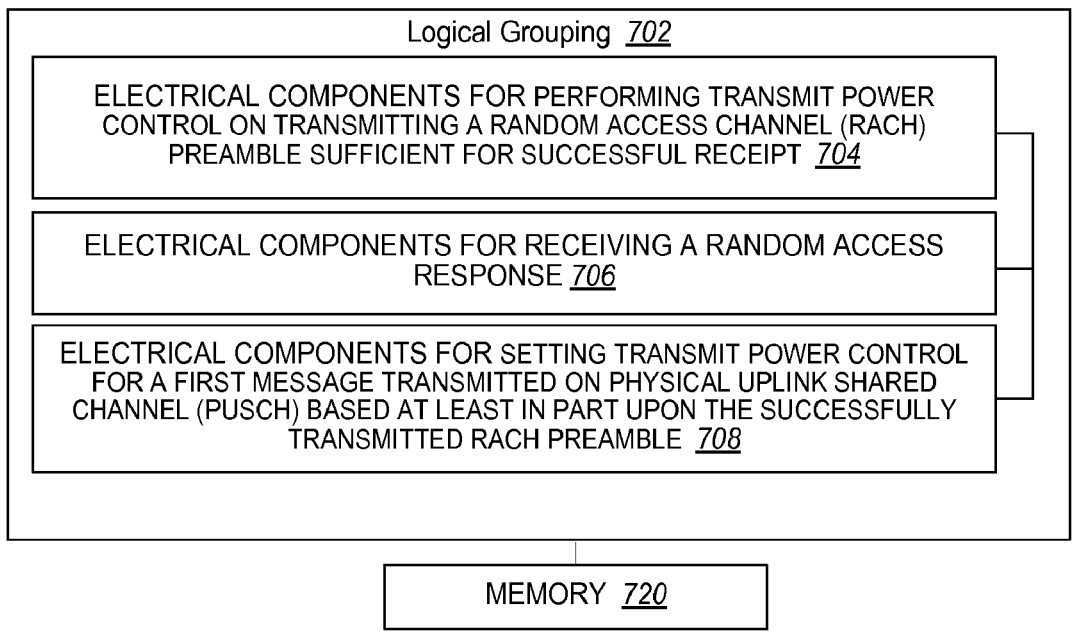
FIG. 7 depicts a block diagram for a system containing logical groupings of electrical components for transmitting a first physical uplink shared channel (PUSCH) message during a Random Access (RACH) procedure.

With reference to FIG. 7, illustrated is a system 700 for transmitting a first physical uplink shared channel (PUSCH) message during a Random Access (RACH) procedure. For example, system 700 can reside at least partially within user equipment (UE). It is to be appreciated that system 700 is represented as including functional blocks, which can be functional blocks that represent functions implemented by at least one processor, a, computer, computer program product, set of instructions, computing platform, processor, software, or combination thereof (e.g., firmware). System 700 includes a logical grouping 702 of electrical components that can act in conjunction. For instance, logical grouping 702 can include an electrical component for performing transmit power control on transmitting a random access channel (RACH) preamble sufficient for successful receipt 704. Moreover, logical grouping 702 can include an electrical component for receiving a random access response 706. Further, logical grouping 702 can include an electrical component for setting transmit power control for a first message transmitted on physical uplink shared channel (PUSCH) based at least in part upon the successfully transmitted RACH preamble 708. Additionally, system 700 can include a memory 720 that retains instructions for executing functions associated with electrical components 704-708. While shown as being external to memory 720, it is to be understood that one or more of electrical components 704-708 can exist within memory 720.

Figure 8:
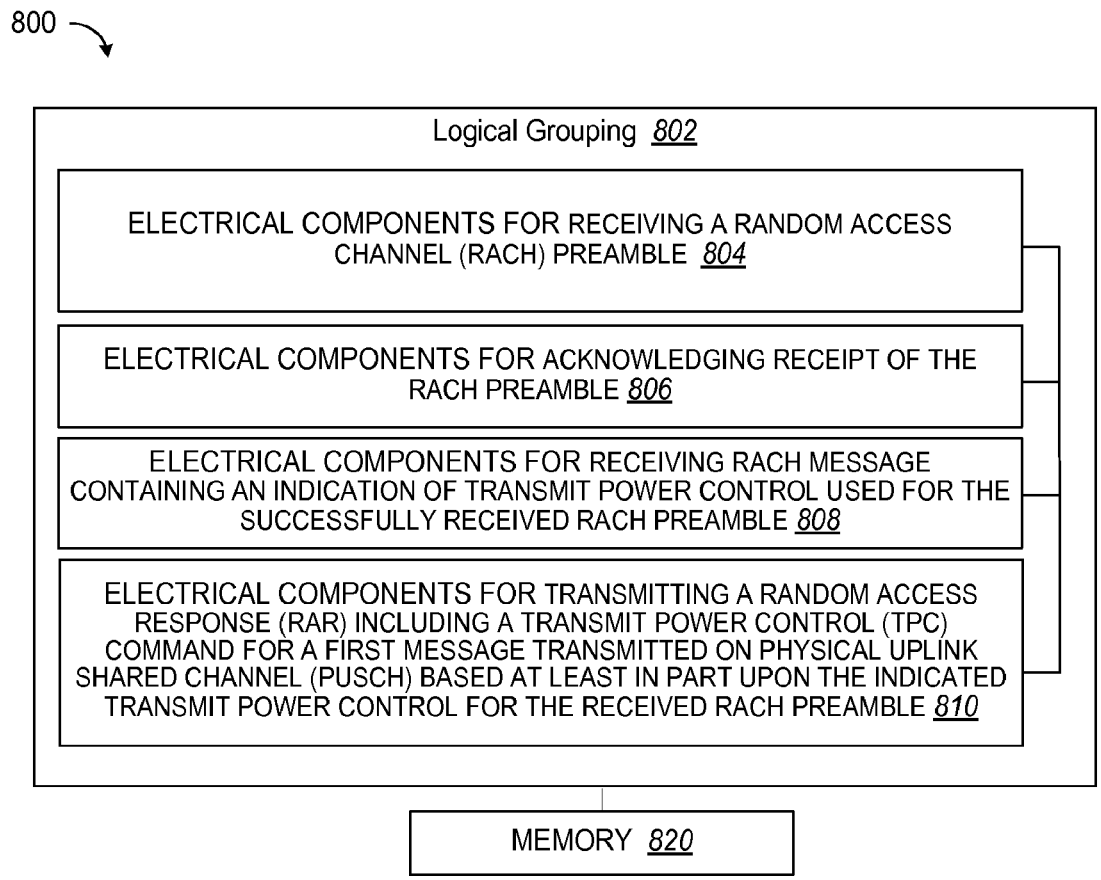
FIG. 8 depicts a block diagram for a system containing logical groupings of electrical components for commanding transmit power control for a first physical uplink shared channel (PUSCH) message during a Random Access (RACH) procedure.

With reference to FIG. 8, illustrated is a system 800 for receiving a first physical uplink shared channel (PUSCH) message during a Random Access (RACH) procedure. For example, system 800 can reside at least partially within a base station. It is to be appreciated that system 800 is represented as including functional blocks, which can be functional blocks that represent functions implemented by a computing platform, processor, software, or combination thereof (e.g., firmware). System 800 includes a logical grouping 802 of electrical components that can act in conjunction. For instance, logical grouping 802 can include an electrical component for receiving a random access channel (RACH) preamble 804. Moreover, logical grouping 802 can include an electrical component for acknowledging successful receipt of the RACH preamble 806. Further, logical grouping 802 can include an electrical component for receiving a RACH message containing an indication of transmit power control used for successful RACH preamble transmission 808. Logical grouping 802 can include an electrical component for transmitting a random access response (RAR) including a transmit power control (TPC) command for a first message transmitted on physical uplink shared channel (PUSCH) based at least in part upon a transmit power control for the received RACH preamble 810. Additionally, system 800 can include a memory 820 that retains instructions for executing functions associated with electrical components 804-810. While shown as being external to memory 820, it is to be understood that one or more of electrical components 804-810 can exist within memory 820.

Figure 9:
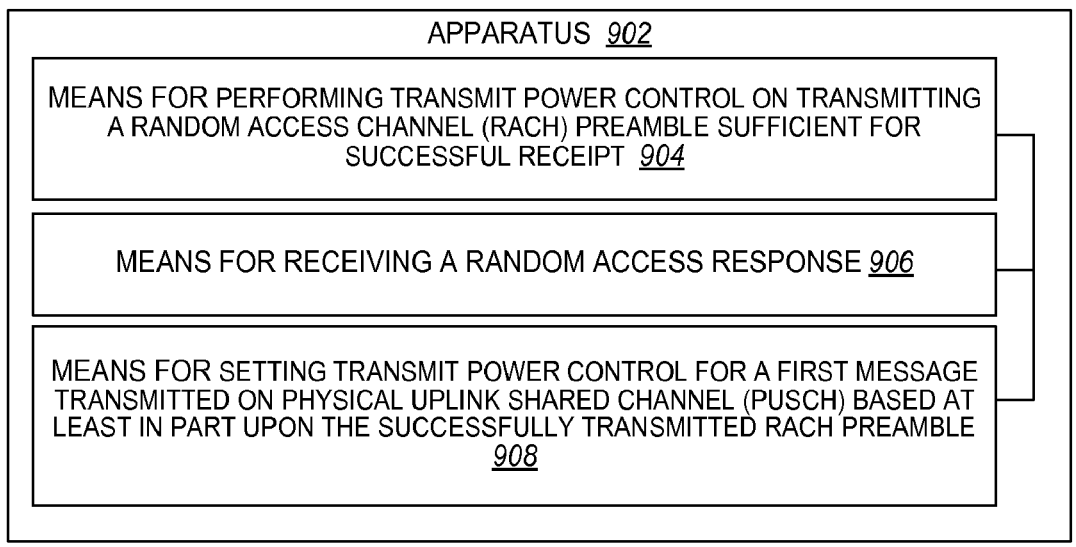
FIG. 9 depicts a block diagram for an apparatus having means for transmitting a first physical uplink shared channel (PUSCH) message during a Random Access (RACH) procedure.

With reference to FIG. 9, an apparatus 902 is provided for transmitting a first physical uplink shared channel (PUSCH) message during a Random Access (RACH) procedure. Means 904 are provided for performing transmit power control on transmitting a random access channel (RACH) preamble sufficient for successful receipt. Means 906 are provided for receiving a random access response. Means 908 are provided for setting transmit power control for a first message transmitted on physical uplink shared channel (PUSCH) based at least in part upon the successfully transmitted RACH preamble.

Figure 10:
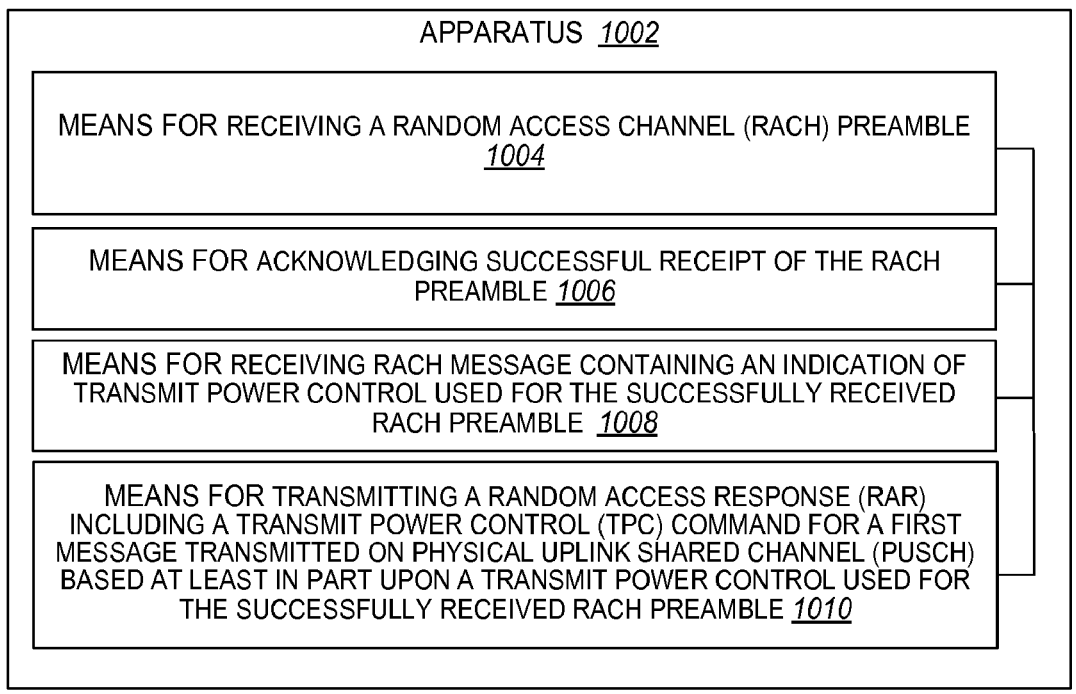
FIG. 10 depicts a block diagram for an apparatus having means for commanding transmit power control for a first physical uplink shared channel (PUSCH) message during a Random Access (RACH) procedure.

With reference to FIG. 10, an apparatus 1002 is provided for receiving a first physical uplink shared channel (PUSCH) message during a Random Access (RACH) procedure. Means 1004 are provided for receiving a random access channel (RACH) preamble. Means 1006 are provided for acknowledging successful receipt of the RACH preamble. Means 1008 are provided for receiving a RACH message containing an indication of transmit power control used for successful RACH preamble transmission. Means 1010 are provided for transmitting a random access response (RAR) including a transmit power control (TPC) command for a first message transmitted on physical uplink shared channel (PUSCH) based at least in part upon a transmit power control for the successfully received RACH preamble.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for transmit power control by a user equipment (UE), comprising:
   receiving a random access response from an evolved Node B (eNB) sent in response to a random access channel preamble successfully received by the eNB, the random access response comprising a transmit power control command; and
   setting transmit power control for a first message transmitted on a physical uplink shared channel based, at least in part, on the transmit power control command.

2. The method of claim 1, further comprising:
   transmitting, to the eNB, the random access channel preamble at a nominal transmit power level; and
   retransmitting a random access channel preamble at a power level higher than the nominal transmit power level in response to failing to receive a positive indication of reception of the random access channel preamble transmitted at the nominal transmit power level.

3. The method of claim 2, wherein the nominal transmit power level is signaled from higher layers.

4. The method of claim 2, further comprising:
   obtaining a relative transmit power level of the random access channel preamble received by the eNB, wherein the relative transmit power level comprises a total power from a power level of a first random access channel preamble transmission to a power level of a last random access channel preamble transmission.

5. The method of claim 4, further comprising setting the transmit power control for the first message based, at least in part, on the relative transmit power level.

6. The method of claim 1, further comprising:
   managing transmission of the random access channel preamble by a medium access control layer; and
   managing transmission on the physical uplink shared channel by a physical layer.

7. A method for transmit power control by an evolved Node B (eNB), comprising:
   transmitting a random access response to a user equipment (UE) in response to a random access channel preamble successfully received by the eNB, the random access response comprising a transmit power control command; and receiving a first message transmitted on a physical uplink shared channel, wherein transmit power control for the first message is based, at least in part, on the transmit power control command.

8. The method of claim 7, further comprising:
receiving a random access channel preamble retransmitted at a power level higher than a nominal transmit power level, wherein the random access channel preamble is retransmitted by the UE in response to not receiving a positive indication of reception of a random access channel preamble transmitted at the nominal transmit power level.

9. The method of claim 8, wherein the nominal transmit power level is signaled from higher layers.

10. The method of claim 8, wherein the transmit power control for the first message is based, at least in part, on a relative transmit power level of the random access channel preamble received by the eNB.

11. The method of claim 10, wherein the relative transmit power level comprises a total power from a power level of a first random access channel preamble transmission to a power level of a last random access channel preamble transmission.

12. An apparatus for transmit power control by a user equipment (UE), comprising:
means for receiving a random access response from an evolved Node B (eNB) sent in response to a random access channel preamble successfully received by the eNB, the random access response comprising a transmit power control command; and
means for setting transmit power control for a first message transmitted on a physical uplink shared channel based, at least in part, on the transmit power control command.

13. The apparatus of claim 12, further comprising:
means for transmitting, to the eNB, the random access channel preamble at a nominal transmit power level; and
means for retransmitting a random access channel preamble at a power level higher than the nominal transmit power level in response to failing to receive a positive indication of reception of the random access channel preamble transmitted at the nominal transmit power level.

14. The apparatus of claim 13, wherein the nominal transmit power level is signaled from higher layers.

15. The apparatus of claim 13, further comprising:
means for obtaining a relative transmit power level of the random access channel preamble received by the eNB, wherein the relative transmit power level comprises a total power from a power level of a first random access channel preamble transmission to a power level of a last random access channel preamble transmission.

16. The apparatus of claim 15, further comprising means for setting the transmit power control for the first message based, at least in part, on the relative transmit power level.

17. The apparatus of claim 12, further comprising:
means for managing transmission of the random access channel preamble by a medium access control layer; and
means for managing transmission on the physical uplink shared channel by a physical layer.

18. An apparatus for transmit power control by an evolved Node B (eNB), comprising:
means for transmitting a random access response to a user equipment (UE) in response to a random access channel preamble successfully received by the eNB, the random access response comprising a transmit power control command; and
means for receiving a first message transmitted on a physical uplink shared channel, wherein transmit power control for the first message is based, at least in part, on the transmit power control command.

19. The apparatus of claim 18, further comprising:
means for receiving a random access channel preamble retransmitted at a power level higher than a nominal transmit power level, wherein the random access channel preamble is retransmitted by the UE in response to not receiving a positive indication of reception of a random access channel preamble transmitted at the nominal transmit power level.

20. The apparatus of claim 19, wherein the nominal transmit power level is signaled from higher layers.

21. The apparatus of claim 19, wherein the transmit power control for the first message is based, at least in part, on a relative transmit power level of the random access channel preamble received by the eNB.

22. The apparatus of claim 21, wherein the relative transmit power level comprises a total power from a power level of a first random access channel preamble transmission to a power level of a last random access channel preamble transmission.

23. An apparatus for transmit power control by a user equipment (UE), comprising at least one processor configured to:
receive a random access response from an evolved Node B (eNB) sent in response to a random access channel preamble successfully received by the eNB, the random access response comprising a transmit power control command; and
set transmit power control for a first message transmitted on a physical uplink shared channel based, at least in part, on the transmit power control command; and
a memory coupled to the at least one processor.

24. The apparatus of claim 23, the at least one processor further configured to:
transmit, to the eNB, the random access channel preamble at a nominal transmit power level; and
retransmit a random access channel preamble at a power level higher than the nominal transmit power level in response to failing to receive a positive indication of reception of the random access channel preamble transmitted at the nominal transmit power level.

25. The apparatus of claim 24, wherein the nominal transmit power level is signaled from higher layers.

26. The apparatus of claim 23, the at least one processor further configured to:
obtain a relative transmit power level of the random access channel preamble received by the eNB, wherein the relative transmit power level comprises a total power from a power level of a first random access channel preamble transmission to a power level of a last random access channel preamble transmission.

27. The apparatus of claim 26, the at least one processor further configured to:
set the transmit power control for the first message based, at least in part, on the relative transmit power level.

28. The apparatus of claim 23, the at least one processor further configured to:
manage transmission of the random access channel preamble by a medium access control layer; and
manage transmission on the physical uplink shared channel by a physical layer.

29. An apparatus for transmit power control by an evolved Node B (eNB), comprising at least one processor configured to:
  transmit a random access response to a user equipment (UE) in response to a random access channel preamble successfully received by the eNB, the random access response comprising a transmit power control command; and
  receive a first message transmitted on a physical uplink shared channel, wherein transmit power control for the first message is based, at least in part, on the transmit power control command; and
  a memory coupled to the at least one processor.

30. The apparatus of claim 29, the at least one processor further configured to:
  receive a random access channel preamble retransmitted at a power level higher than a nominal transmit power level, wherein the random access channel preamble is retransmitted by the UE in response to not receiving a positive indication of reception of a random access channel preamble transmitted at the nominal transmit power level.

31. The apparatus of claim 30, wherein the nominal transmit power level is signaled from higher layers.

32. The apparatus of claim 30, wherein the transmit power control for the first message is based, at least in part, on a relative transmit power level of the random access channel preamble received by the eNB.

33. The apparatus of claim 32, wherein the relative transmit power level comprises a total power from a power level of a first random access channel preamble transmission to a power level of a last random access channel preamble transmission.

34. A non-transitory computer-readable medium for transmit power control by a user equipment (UE), comprising:
  code for receiving a random access response from an evolved Node B (eNB) sent in response to a random access channel preamble successfully received by the eNB, the random access response comprising a transmit power control command; and
  code for setting transmit power control for a first message transmitted on a physical uplink shared channel based, at least in part, on the transmit power control command.

35. A non-transitory computer-readable medium for transmit power control by an evolved Node B (eNB), comprising:
  code for transmitting a random access response to a user equipment (UE) in response to a random access channel preamble successfully received by the eNB, the random access response comprising a transmit power control command; and
  code for receiving a first message transmitted on a physical uplink shared channel, wherein transmit power control for the first message is based, at least in part, on the transmit power control command.

* * * * *